(12) United States Patent
Bito et al.

(10) Patent No.: US 8,443,914 B2
(45) Date of Patent: May 21, 2013

(54) ATTACHMENT DEVICE-EQUIPPED ELECTRIC TOOL

(75) Inventors: Shinya Bito, Anjo (JP); Kiyonobu Yoshikane, Anjo (JP); Hitoshi Iida, Anjo (JP); Shinji Onoda, Anjo (JP); Yoshitaka Machida, Anjo (JP)

(73) Assignee: Makita Corporation, Anjo (JP)

( * ) Notice: Subject to any disclaimer, the term of this patent is extended or adjusted under 35 U.S.C. 154(b) by 322 days.

(21) Appl. No.: 13/029,524

(22) Filed: Feb. 17, 2011

(65) Prior Publication Data

US 2011/0226502 A1 Sep. 22, 2011

(30) Foreign Application Priority Data

Mar. 16, 2010 (JP) .................................. 2010-059704
Jan. 12, 2011 (JP) .................................. 2011-004265

(51) Int. Cl.
 *B25D 17/14* (2006.01)
(52) U.S. Cl.
 USPC ............. 173/198; 173/217; 175/209; 408/58; 408/67
(58) Field of Classification Search
 USPC ........ 173/197, 198, 217, 75, 97, 171; 408/58, 408/67; 175/211, 209
 See application file for complete search history.

(56) References Cited

U.S. PATENT DOCUMENTS

| | | | | |
|---|---|---|---|---|
| 3,511,322 A | * | 5/1970 | Holman et al. | ............. 173/75 |
| 4,097,176 A | * | 6/1978 | Wanner et al. | .............. 408/56 |
| 5,090,499 A | * | 2/1992 | Cuneo | ........................... 175/209 |
| 5,129,467 A | * | 7/1992 | Watanabe et al. | ............... 173/75 |
| 5,467,835 A | * | 11/1995 | Obermeier et al. | ........... 175/209 |
| 5,662,440 A | * | 9/1997 | Kikuchi et al. | ............... 409/182 |
| 5,881,823 A | * | 3/1999 | Kabatnik et al. | .............. 173/217 |
| 6,223,835 B1 | * | 5/2001 | Habedank et al. | ............ 173/217 |
| 6,412,572 B2 | * | 7/2002 | Habedank et al. | ............ 173/217 |
| 6,536,536 B1 | * | 3/2003 | Gass et al. | ........................ 173/2 |
| 6,615,930 B2 | * | 9/2003 | Bongers-Ambrosius et al. | ............................. 173/198 |
| 7,017,680 B2 | | 3/2006 | Arich et al. | |
| 7,909,114 B2 | * | 3/2011 | Nishikawa et al. | ............. 173/75 |

FOREIGN PATENT DOCUMENTS

| | | |
|---|---|---|
| DE | 35 16 099 A1 | 11/1986 |
| DE | 10 2005 062 464 A1 | 6/2007 |
| GB | 2 433 711 A | 7/2007 |

OTHER PUBLICATIONS

Extended European Search Report issued in European Patent Application No. 11155998.5 dated Jul. 7, 2011.

* cited by examiner

*Primary Examiner* — Scott A. Smith
(74) *Attorney, Agent, or Firm* — Oliff & Berridge, PLC (57) ABSTRACT

A hammer drill is provided with a connector equipped with a female terminal, movably between a connection position where the female terminal is located inside a plug-in port and a non-connection position where the female terminal is in retreat from inside the plug-in port. The hammer drill is also provided with a torsion spring that urges the connector toward the non-connection position. The connector is provided with a shutter portion that is located inside the plug-in port to close the plug-in port at the non-connection position and is in retreat from inside the plug-in port at the connection position. A dust collecting device is provided with a press rail that comes into abutment on the connector to move the connector to the connection position against the urging of the torsion spring as the dust collecting device is mounted.

27 Claims, 8 Drawing Sheets

ATTACHMENT DEVICE-EQUIPPED ELECTRIC TOOL

BACKGROUND OF THE INVENTION

The disclosure of Japanese Patent Application Numbers 2010-059704 filed on Mar. 16, 2010 and 2011-004265 filed on Jan. 12, 2011 including the specification, drawings and abstract is incorporated herein by reference in its entirety.

FIELD OF THE INVENTION

The present invention relates to an electric tool, such as an electric drill or a hammer drill, which is mounted with an attachment device such as a dust collecting device.

DESCRIPTION OF THE RELATED ART

An electric drill or a hummer drill sometimes includes an attachment device. The attachment device may be a dust collecting device collecting and gathering powder dust produced from a worked material during a drilling operation or the like, or a light unit for illuminating a tip of a tool. For example, U.S. Pat. No. 7,017,680 discloses a dust collecting device as an attachment device in which a plug (a male terminal) electrically connected to an accommodated dust collecting motor is protrusively provided on a dust collecting device. Further, it discloses a socket (a female terminal), which is electrically connected to a power supply side and has the plug plugged therein and connected thereto when the dust collecting device is mounted, is provided on an electric tool side, so that power can be supplied from the electric tool to the attachment device.

With a view to protecting the socket when the dust collecting device is not mounted, a socket cover is provided in a housing of the electric tool. The socket cover has a permeable hole corresponding to a plug-in port to the socket, can slide in such a direction as to cross a region in front of the socket, and is urged by a coil spring toward a closed position where the permeable hole is offset from the plug-in port. When the dust collecting device is mounted, a tapered face of a protrusion provided adjacently to the plug of the dust collecting device comes into abutment on the socket cover. Thus, the socket cover retreats against the urging of the coil spring, and makes the permeable hole coincident in position with the plug-in port to allow the plug to be inserted into the socket.

However, the attachment device-equipped electric tool of the aforementioned U.S. Pat. No. 7,017,680 is structured such that the socket cover is slid through direct abutment of the protrusion thereon. Therefore, a large retreat stroke of the socket cover cannot be ensured, and the construction of the attachment device-equipped electric tool serves solely to offset the permeable hole provided through the socket cover from the plug-in port. In consequence, when the socket cover retreats, the permeable hole and the plug-in port may not coincide in position with each other due to an assembling error or the like, and a deterioration in plug-in reliability is caused through contact with the plug or the like. Thus, it is desirable to retreat the entire socket cover from the plug-in port with the retreat stroke of the socket cover increased. However, when the tapered face of the protrusion is enlarged or changed otherwise to ensure this increased stroke, a large space is required of a mechanism for opening/closing the plug-in port. As a result, there is an obstacle to making the electric tool and the attachment device compact.

SUMMARY OF THE INVENTION

An object of the present invention is to provide an attachment device-equipped electric tool that can ensure plug-in reliability by reliably opening a plug-in port on a female terminal side when a male terminal is plugged thereinto and also allows a mechanism for opening/closing the plug-in port to be formed in a space-saving manner.

In order to achieve the above-stated object, according to a first aspect of the present invention, there is provided an attachment device-equipped electric tool to which an attachment device is joined. The attachment device-equipped electric tool includes a male terminal, a female terminal, a connector, an urging unit, a shutter portion, and a press portion. The male terminal is protrusively provided on one of the electric tool and the attachment device. The female terminal is provided on the other of the electric tool and the attachment device, is located inside a plug-in port into which the male terminal can be inserted, and is electrically connected to the male terminal to allow power to be supplied from the electric tool to the attachment device as the attachment device is joined to the electric tool. The connector is provided on the other of the electric tool and the attachment device to support the female terminal, and is movable between a connection position where the female terminal is located inside the plug-in port and a non-connection position where the female terminal is in retreat from inside the plug-in port. The urging unit is provided on the other of the electric tool and the attachment device to urge the connector toward the non-connection position. The shutter portion is provided on the connector, is located inside the plug-in port at the non-connection position to close the plug-in port, and is in retreat from inside the plug-in port at the connection position. The press portion is provided on the one of the electric tool and the attachment device, and comes into abutment on the connector to move the connector to the connection position against urging of the urging unit as the attachment device is mounted.

In the foregoing first aspect of the present invention, the connector may be provided rotatably between the connection position and the non-connection position.

In the foregoing first aspect of the present invention, the attachment device may be slid and mounted to the electric tool, the other of the electric tool and the attachment device on which the female terminal is provided may have an outer face provided with a guide groove parallel to a direction of the sliding so that part of the connector protrudes into the guide groove. Further, the press portion may be a press rail that is provided on an outer face of the one of the electric tool and the attachment device on which the male terminal is provided and slides in the guide groove to come into abutment on the part of the connector as the attachment device is mounted.

Furthermore, the connector may be vertically rotatably supported. The connector may be rotatably supported by fitting bosses protrusively provided on an inner face of a housing of the electric tool into circular recess portions formed in right and left outer faces of the connector respectively. The shutter portion may be an arc-like plate body whose center is a rotational center of the connector.

In order to achieve the above-stated object, according to a second aspect of the present invention, there is provided an attachment device-equipped electric tool to which an attachment device is joined. The attachment device-equipped electric tool includes a male terminal, a female terminal, a shutter, a rotary member, an urging unit, and a press portion. The male terminal is protrusively provided on one of the electric tool and the attachment device. The female terminal is provided on the other of the electric tool and the attachment device, is located inside a plug-in port into which the male terminal can be inserted, and is electrically connected to the male terminal to allow power to be supplied from the electric tool to the attachment device as the attachment device is joined to the electric tool. The shutter is provided on the other of the electric tool and the attachment device and can slide between an open position and a closed position of the plug-in port. The rotary member is provided on the other of the electric tool and the attachment device and can rotate through engagement of one end thereof with the shutter. The urging unit is provided on the other of the electric tool and the attachment device to urge the rotary member in a rotational direction in which the shutter slides to the closed position. The press portion is provided on the one of the electric tool and the attachment device and comes into abutment on the other end of the rotary member to rotate the rotary member, against urging of the urging unit, in a rotational direction in which the shutter slides to the open position as the attachment device is mounted.

In the foregoing second aspect of the present invention, the attachment device may be slid and mounted to the electric tool, the other of the electric tool and the attachment device on which the female terminal is provided may have an outer face provided with a guide groove parallel to a direction of the sliding so that the other end of the rotary member protrudes into the guide groove, and the press portion may be a press rail that is provided on an outer face of the one of the electric tool and the attachment device on which the male terminal is provided and slides in the guide groove to come into abutment on the other end of the rotary member as the attachment device is mounted.

In the foregoing first or second aspect of the present invention, the electric tool may be provided with the plug-in port and the female terminal, and the attachment device may be provided with the male terminal.

In the foregoing first or second aspect of the present invention, the male terminal may have a protection rib provided therealong.

In the aforementioned construction, the protection rib may be provided parallel to the male terminal at an outer position thereof.

In the foregoing first or second aspect of the present invention, at least one of the electric tool and the attachment device may have an outer face provided with an elastic member that presses the other of the electric tool and the attachment device when the electric tool and the attachment device are mounted to each other, in at least one of a mounting direction of the attachment device and a direction intersecting therewith. A rubber piece or a metallic press plate formed by bending such that a central portion thereof protrudes may be adopted as the elastic member.

Furthermore, the attachment device may be formed with a placement face on which a mounting portion formed on a housing of the electric tool is placed, a pair of right and left guide rails may be formed in a standing manner on the placement face and arranged at such an interval that a lower portion of the mounting portion can be fitted therebetween, streak-like protrusions may be formed at upper ends of the guide rails, and can be fitted into a pair of right and left joint grooves formed in both lateral faces of the lower portion of the mounting portion, and the attachment device may be joined to the electric tool by sliding the mounting portion between the guide rails to fit the streak-like protrusions into the joint grooves respectively. The attachment device may be a dust collecting device that gathers powder dust produced from a worked material through the use of the electric tool. It is desirable that the dust collecting device be removably equipped with a dust box for gathering powder dust.

According to the foregoing first and second aspects of the present invention, the plug-in port on the female terminal side can be reliably opened when the male terminal is plugged thereinto. Thus, reliability can be ensured in plug-in connection. Further, a mechanism for opening/closing the plug-in port can be formed in a space-saving manner. Thus, there is no obstacle to making the electric tool and the attachment device compact.

According to one of the aforementioned constructions, in addition to the effect of the foregoing first aspect of the present invention, the connector can be moved between the connection position and the non-connection position in a more space-saving manner.

According to another one of the aforementioned constructions, in addition to the effect of the foregoing first aspect of the present invention, the connector can be smoothly moved as the attachment device is slid and mounted. Besides, further integration of the electric tool with the attachment device can also be realized due to the fitting of the press rail in the guide groove.

According to still another one of the aforementioned constructions, in addition to the aforementioned effects, since the female terminal is provided on the electric tool side, the electric tool has no protruding region resulting from the terminal. As a result, there is no obstacle when the electric tool is used alone.

According to still another one of the aforementioned constructions, in addition to the aforementioned effects, an effect of preventing the male terminal from being damaged can be achieved through the adoption of the protection rib.

According to still another one of the aforementioned constructions, in addition to the aforementioned effects, the jouncing between the electric tool and the attachment device can be suppressed through the adoption of the elastic member. As a result, unification can be enhanced when the attachment device is mounted.

DETAILED DESCRIPTION OF THE EMBODIMENTS

Embodiments of the present invention will be described hereinafter on the basis of the drawings.

[First Embodiment]

Figure 1:
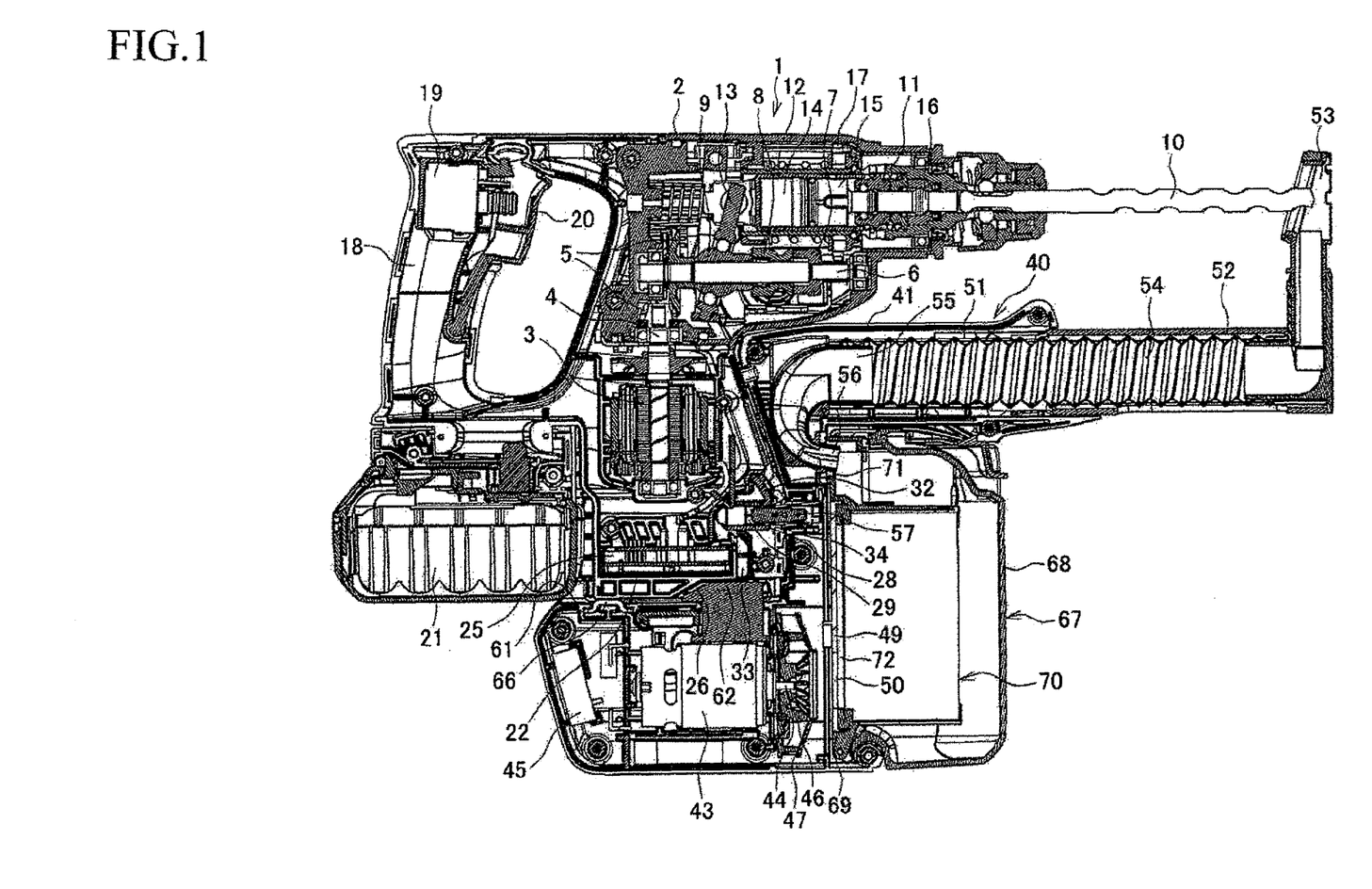
FIG. 1 is a longitudinal sectional view of a hammer drill mounted with a dust collecting device according to a first embodiment of the present invention.
Figure 2:
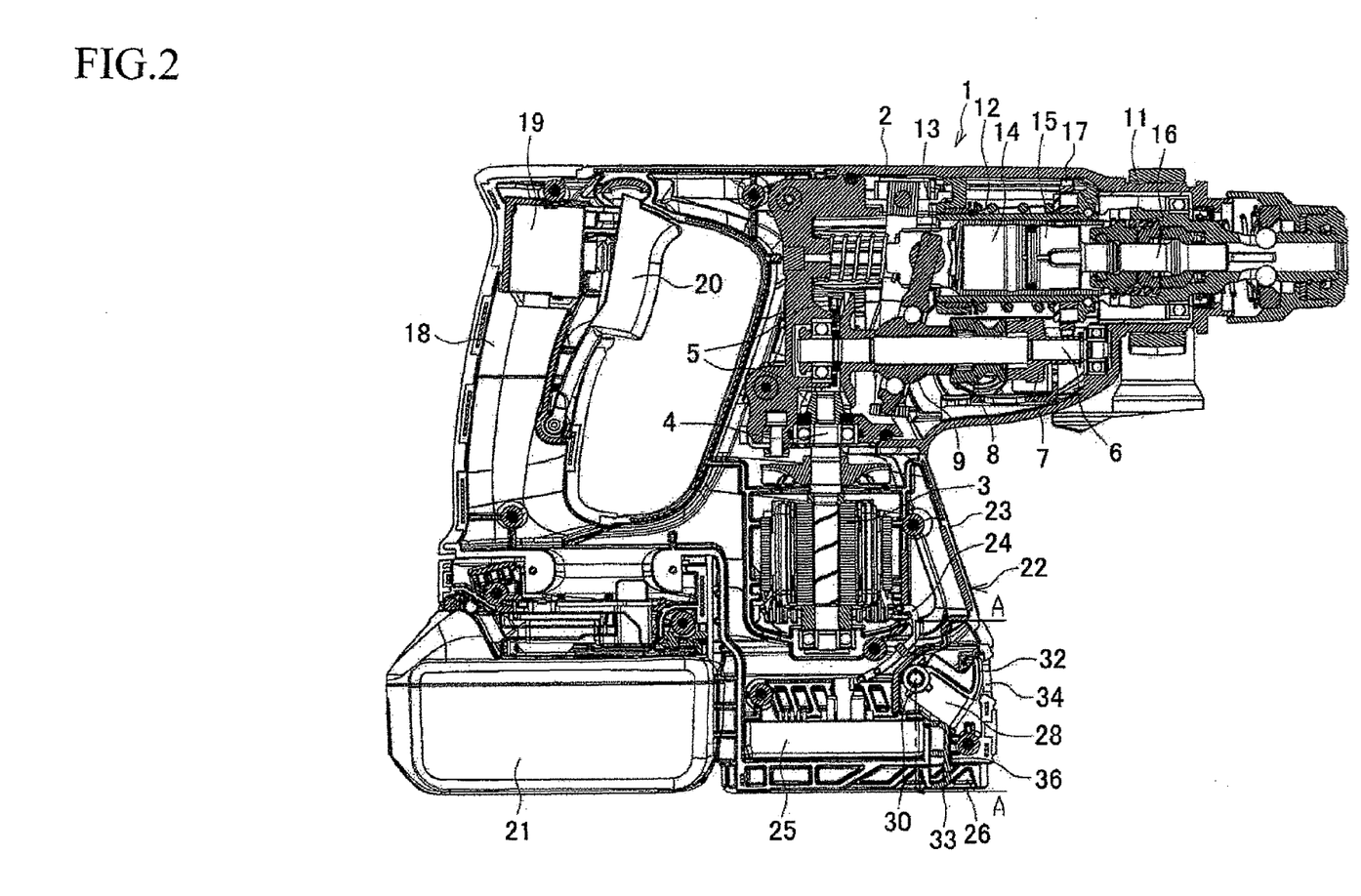
FIG. 2 is a longitudinal sectional view of the hammer drill according to the first embodiment of the present invention.

FIG. 1 shows, as an example of an attachment device-equipped electric tool, an example in which a hammer drill as an electric tool is mounted with a dust collecting device, and FIG. 2 shows the hammer drill alone. First of all, the hammer drill 1 accommodates a motor 3 located at a center on a front side (the right side is defined as the front side in FIGS. 1 and 2) of a housing 2 constructed by assembling a pair of right and left half housings with each other, with an output shaft 4 directed upward. The hammer drill 1 is equipped with a first gear 7, a clutch 8, and a boss sleeve 9, which are arranged in this order from the front side on an intermediate shaft 6 to which torque is transmitted via bevel gears 5 and 5 above the output shaft 4. A tool holder 11 having a tip to which a bit 10 can be inserted and fitted is axially supported parallel to the intermediate shaft 6 above the intermediate shaft 6. An arm 13 sheathed with the boss sleeve 9 via a swash bearing is coupled to a rear end of a piston cylinder 12 loosely inserted in a rear region of the tool holder 11. A striker 15 is longitudinally movably fitted inside the piston cylinder 12 via an air chamber 14, and can strike an impact bolt 16 provided in front of the striker 15. The first gear 7 meshes with a second gear 17 mounted to the tool holder 11.

Figure 3:
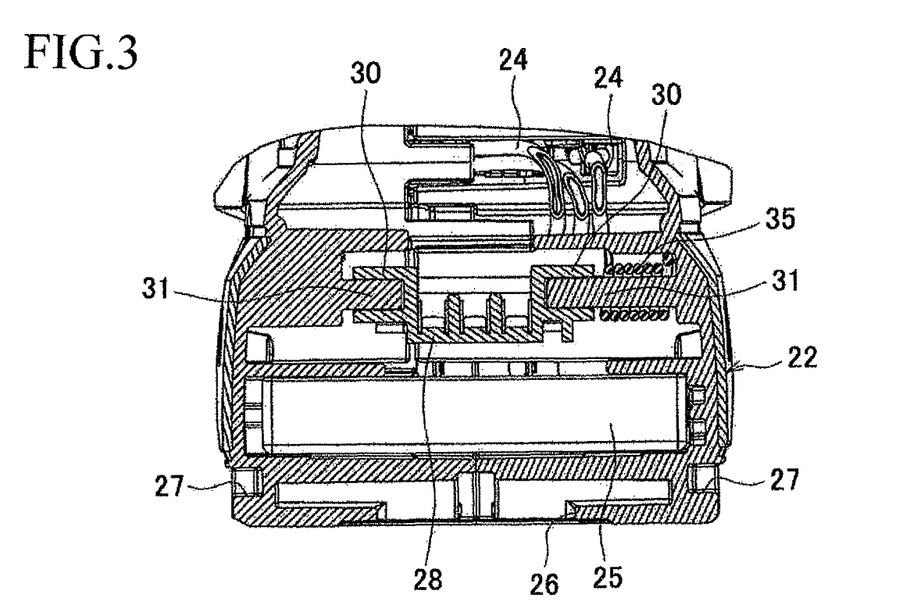
FIG. 3 is an enlarged sectional view taken along a line A-A of FIG. 2.
Figure 4:
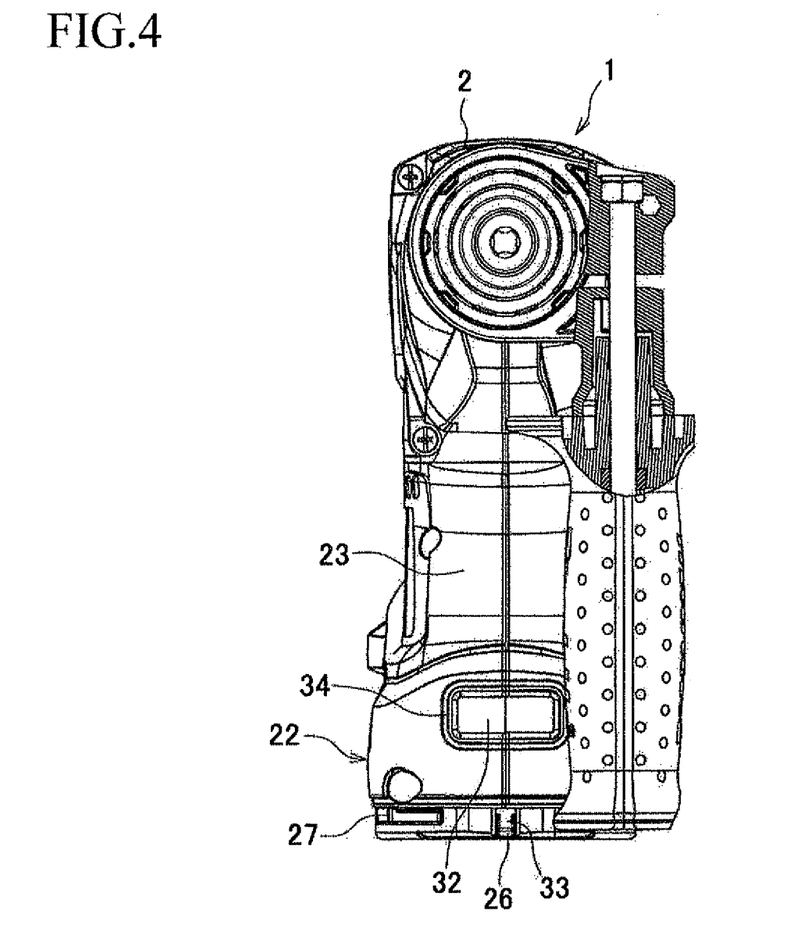
FIG. 4 is a front view of the hammer drill according to the first embodiment of the present invention.

On the other hand, a handle 18 equipped with a switch 19 and a switch lever 20 is formed in an upper rear portion of the housing 2. A battery pack 21 serving as a power supply is mounted below the handle 18. Further, a lower front portion of the housing 2 constitutes a mounting portion 22 protruding forward of the battery pack 21 and having a dust collecting device 40 mounted thereto. A front face of the mounting portion 22 is an inclined face portion 23 inclined forward and downward. A controller 25, which is electrically connected to a coil of the motor 3, the switch 19, and the battery pack 21 by lead wires 24, 24 . . . , is accommodated inside the mounting portion 22. As shown in FIGS. 3 and 4, a guide groove 26 having a front end opening forward is longitudinally provided in a recessed manner in a lower face of the mounting portion 22 at a lateral center thereof. A pair of right and left joint grooves 27 and 27 each having a front end opening forward are longitudinally provided in a recessed manner in both lateral faces of a lower portion of the mounting portion 22 respectively.

A connector 28 having three female terminals 29 for power supply and communication arranged side by side is provided on an upper front side of the controller 25. The connector 28 is formed in the shape of an angular cylinder with an open front side. As shown in FIG. 3, bosses 31 and 31 protrusively provided on inner faces of the right and left half housings are fitted in circular recess portions 30 and 30 formed in right and left outer faces of the connector 28 respectively. Accordingly, the connector 28 is supported vertically rotatably around the bosses 31 on a laterally central portion of the mounting portion 22. Furthermore, a shutter portion 32 as an arc-like plate body having the bosses 31 as a center thereof is integrally formed upward at a front end of an upper face of the connector 28. On the other hand, a press strip 33 as part of the connector 28 is integrally formed downward at a center of a lower face of the connector 28.

Meanwhile, a rectangular plug-in port 34 is formed open through the inclined face portion 23 at a location in front of the connector 28. The connector 28 can rotate to an upper connection position where the shutter portion 32 is in retreat above the plug-in port 34 to locate an opening directly behind the plug-in port 34, and a non-connection position where the shutter portion 32 is located directly behind the plug-in port 34 to retreat the opening below the plug-in port 34. However, each of the bosses 31 is sheathed with a torsion spring 35 as an urging unit. The torsion spring 35 is engaged at one end thereof with a corresponding one of the half housing sides, and at the other end thereof with the connector 28. Accordingly, when the dust collecting device 40 is not mounted, the connector 28 is rotationally urged to the non-connection position where the shutter portion 32 closes the plug-in port 34. At the non-connection position, the press strip 33 of the connector 28 extends through a permeable hole 36 formed through the mounting portion 22, and protrudes into the guide groove 26.

Figure 5:
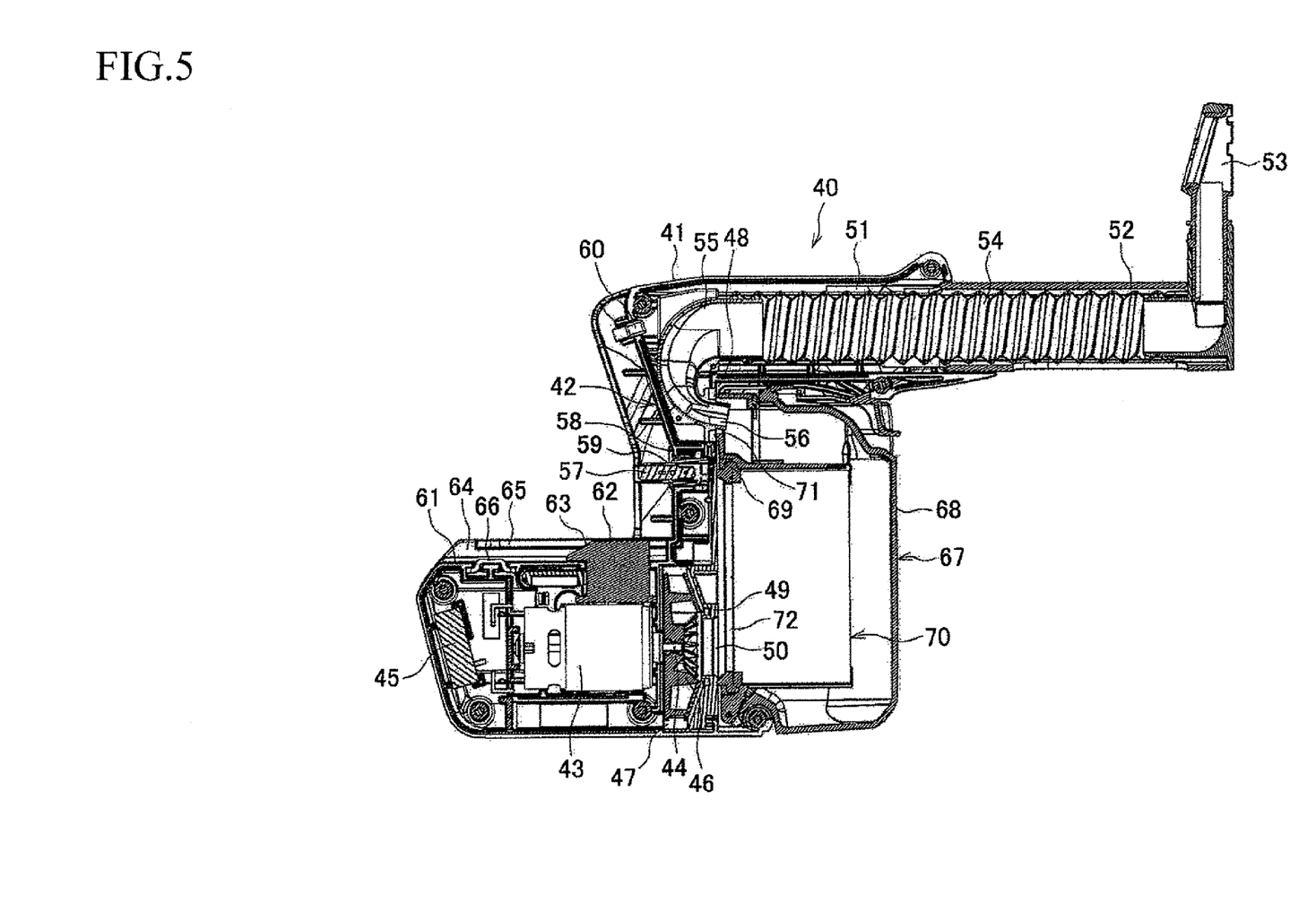
FIG. 5 is a longitudinal sectional view of the dust collecting device according to the first embodiment of the present invention.

As shown in FIG. 5 as well, the dust collecting device 40 is equipped with a fitting recess portion 42 abutting on and fitted to a bottom face and the inclined face portion 23 of the mounting portion 22 of the hammer drill 1, and has a casing 41 in an inverse L shape when viewed in a side view and composed of right and left half casings assembled with each other. A motor 43 having an output shaft 44 directed forward is laterally accommodated behind the casing 41, and a controller 45 is provided behind the motor 43. Further, a dust collecting fan 46 is secured to the output shaft 44, and is accommodated in an intake chamber 47 defined in the casing 41 and equipped with an exhaust port (not shown) on a lateral side of the intake chamber 47. A joint portion of a dust box 67 formed on the casing 41 in front of the intake chamber 47 is denoted by 48. The joint portion 48 is formed in the shape of a recess opening only forward. A communication hole 50 through which the joint portion 48 communicates with the intake chamber 47 on the same axis of the dust collecting fan 46 is formed in a partition wall 49 constituting a bottom of the joint portion 48.

On the other hand, a guide passage 51 having an open front end and a rear end making a U-shaped turn to extend to a region behind the joint portion 48 is longitudinally formed above the joint portion 48. An L-shaped nozzle 52 is coupled to the front end of the guide passage 51, and a tip of the nozzle 52 having a suction port 53 protrudes upward. A flexible hose 54 is so accommodated as to extend in both the nozzle 52 and the guide passage 51. A rectangular cylinder duct 55 bent back in a U-shaped manner along the shape of the rear end of the guide passage 51 is coupled to a rear end of the flexible hose 54. A tip portion 56 of the duct 55 as a cylinder body penetrates the partition wall 49 and protrudes into the joint portion 48.

Further, three male terminals 57 for power supply and communication are laterally provided side by side at intervals of a predetermined distance behind the joint portion 48. Each of these male terminals 57 is a plate body that is securely plugged in a curved rear face 58, which is matched with a front face of the mounting portion 22 of the hammer drill 1 through formation of the fitting recess portion 42, and protrudes backward. The casing 41 is provided with a pair of protection ribs 59 fixed to rightmost and leftmost ones of the male terminals 57 parallel thereto at outer positions thereof respectively and having tips protruding backward. Accordingly, the male terminals 57 are protected, on right and left outer sides thereof, by the protection ribs 59. Furthermore, a rubber piece 60 as an elastic body is laterally fitted and secured, in a curved manner corresponding to the shape of the curved rear face 58, to the curved rear face 58 above the male terminals 57, and a rear face of the rubber piece 60 protrudes backward from the curved rear face 58.

On the other hand, an upper rear face of the casing 41 that forms the fitting recess portion 42 constitutes a flat placement face 61 on which the mounting portion 22 of the hammer drill 1 is placed. A press rail 62 as a press portion fitted in the guide groove 26 provided in the lower face of the mounting portion 22 is protrusively provided longitudinally on a front region of the placement face 61 at a lateral center thereof. An inclined face 63 whose height decreases backward is formed at a rear end of the press rail 62.

Further, a pair of guide rails 64 and 64 are longitudinally erected on both right and left sides of the placement face 61 respectively, at such intervals that the lower portion of the mounting portion 22 can be fitted therebetween. Streak-like protrusions 65, which can be fitted to the joint grooves 27 and 27 of the mounting portion 22 respectively, are protrusively provided inward at upper ends of the guide rails 64 respectively.

Furthermore, a metallic press plate 66 as an elastic body, which is formed by bending such that a central portion thereof protrudes, is held at both front and rear ends thereof by the casing 41 on a backward extended line of the press rail 62. An upper face of the press plate 66 protrudes slightly upward from the placement face 61.

A dust box joined to the joint portion 48 is denoted by 67. The dust box 67 has a box body 68 to which a lid body 69 equipped with a filter unit 70 is joined through a hinge. With the dust box 67 mounted to the joint portion 48, the tip portion 56 of the duct 55 penetrates an inlet 71 provided through the lid body 69, and an outlet 72 faces the communication hole 50.

In the hammer drill 1 constructed as described above, when the dust collecting device 40 is mounted thereto, the guide rails 64 and 64 of the casing 41 are adjusted in position to the lower portion of the mounting portion 22 of the hammer drill 1 to locate the mounting portion 22 on the placement face 61. In this state, the dust collecting device 40 is slid backward such that the fitting recess portion 42 is fitted from forward to the mounting portion 22. Then, the press rail 62 of the dust collecting device 40 is fitted into the guide groove 26 of the mounting portion 22 and slides backward, and the streak-like protrusions 65 of the guide rails 64 are fitted into the joint grooves 27 and slide backward. At this moment, the press rail 62 abuts on the press strip 33 of the connector 28, but presses the press strip 33 upward by the inclined face 63. Therefore, the connector 28 rotates leftward in FIG. 2. Accordingly, the connector 28 moves to the connection position where the shutter portion 32 is in retreat upward to locate the opening directly behind the plug-in port 34.

Then, the male terminals 57 of the dust collecting device 40 enter the housing 2 from the open plug-in port 34, and the mounting portion 22 is fitted into the fitting recess portion 42, so that the male terminals 57 of the dust collecting device 40 are inserted through and electrically connected to the female terminals 29 respectively (FIG. 1).

Meanwhile, the lower face of the mounting portion 22 is placed on the placement face 61, and the front face of the mounting portion 22, which includes the inclined face portion 23, abuts on the curved rear face 58. Accordingly, the press plate 66 protruding from the placement face 61 is thrust to the lower face of the mounting portion 22, thereby elastically pressing the lower face of the mounting portion 22 upward. On the other hand, the rubber piece 60 protruding from the curved rear face 58 is elastically deformed to elastically press the inclined face portion 23 backward. Accordingly, the dust collecting device 40 is mounted without jouncing.

Then, when the switch 19 is turned on through an operation of pressing the switch lever 20 of the hammer drill 1, the motor 3 is driven to rotate the intermediate shaft 6. At this moment, through an operation of sliding the clutch 8 from outside the housing 2, a selection can be made among a forward position where the clutch 8 is engaged only with the first gear 7, a backward position where the clutch 8 is engaged only with the boss sleeve 9, and an intermediate position where the clutch 8 is engaged with the first gear 7 and the boss sleeve 9 at the same time. Owing to this selection, a selection can be made among a drill mode in which the tool holder 11 rotates via the second gear 17 to rotate the bit 10, a hammer mode in which the piston cylinder 12 is moved in a reciprocating manner through the rocking of the arm 13 and the striker 15 interlocked with the piston cylinder 12 strikes the bit 10 via the impact bolt 16, and a hammer drill mode in which the tool holder 11 rotates and the impact bolt 16 strikes the bit 10 at the same time.

On the other hand, in response to the turning-on of the switch 19, the controller 25 supplies power to the controller 45 of the dust collecting device 40. Accordingly, the controller 45 drives the motor 43 and rotates the dust collecting fan 46. Thus, outside air is sucked from the suction port 53 of the nozzle 52, and is discharged from the inlet 71 into the box body 68 of the dust box 67 through the flexible hose 54 and the duct 55. Subsequently, the outside air flows through the filter unit 70, reaches the intake chamber 47 from the outlet 72 via the communication hole 50, and is discharged to the outside from the exhaust port provided through the intake chamber 47. In consequence, powder dust produced from a worked material by the bit 10, which rotates and makes other movements, is sucked into the suction port 53, enters the box body 68 via the nozzle 52, the flexible hose 54, and the duct 55, and is captured by the filter unit 70 to be trapped in the box body 68.

It should be noted that when the switch 19 is turned off by canceling the operation of pressing the switch lever 20, the motor 3 stops and then the rotation of the bit 10 and the like stops. However, the controller 25 is provided with a delay function of stopping the supply of power to the dust collecting device 40 with a delay of several seconds from the turning-off of the switch 19. In the dust collecting device 40, therefore, the dust collecting fan 46 continues to rotate for several seconds after the bit is stopped. Accordingly, the powder dust remaining in the nozzle 52, the flexible hose 54, and the like can also be reliably gathered into the dust box 67.

On the other hand, as for the removal of the dust collecting device 40, the dust collecting device 40 is slid forward from the hammer drill 1 as opposed to the case of mounting. Then, the dust collecting device 40 slides forward due to the guidance of the press rail 62 by the guide groove 26 and the guidance of the streak-like protrusions 65 by the joint grooves 27. As the dust collecting device 40 slides forward, the male terminals 57 separate from the female terminals 29 respectively to be drawn out from the plug-in port 34. After that, the connector 28 having the press strip 33, which has been stopped from being pressed upward by the advanced press rail 62, rotates rightward due to the urging of the torsion spring 35, and returns to the non-connection position. Therefore, as shown in FIGS. 2 and 4, the shutter portion 32 closes the plug-in port 34 again.

As described above, according to the hammer drill 1 of the foregoing first embodiment of the present invention, the connector 28 equipped with the female terminals 29 is provided movably between the connection position where the female terminals 29 are located inside the plug-in port 34 and the non-connection position where the female terminals 29 are in retreat from inside the plug-in port 34, and the torsion spring 35 for urging the connector 28 toward the non-connection position is provided. The connector 28 is provided with the shutter portion 32 that is located inside the plug-in port 34 to close the plug-in port 34 at the non-connection position and is in retreat from inside the plug-in port 34 at the connection position. The dust collecting device 40 is provided with the press rail 62 that comes into abutment on the connector 28 to move the connector 28 to the connection position against the urging of the torsion spring 35 as the dust collecting device 40 is mounted. Thus, the plug-in port 34 on the female terminals 29 side can be reliably opened when the male terminals 57 are plugged thereinto. As a result, reliability can be ensured in plug-in connection. Further, the connector 28 is directly provided with the shutter portion 32 so that the connector 28 itself rotates. Therefore, the number of parts is reduced, and a mechanism for opening/closing the plug-in port 34 can be formed in a space-saving manner. Thus, there is no obstacle to making the hammer drill 1 and the dust collecting device 40 compact.

Especially in this case, the connector 28 is provided rotatably between the connection position and the non-connection position. Therefore, the connector 28 can be moved in a more space-saving manner between the connection position and the non-connection position.

Further, as a member for mounting the dust collecting device 40 to the hammer drill 1 through sliding, the guide groove 26 parallel to the sliding direction is provided in the outer face of the hammer drill 1 so that the press strip 33 of the connector 28 protrudes into the guide groove 26. The press portion is designed as the press rail 62 that is provided on the outer face of the dust collecting device 40 and slides in the guide groove 26 to come into abutment on the press strip 33 of the connector 28 as the dust collecting device 40 is mounted. Thus, the connector 28 can be smoothly moved as the dust collecting device 40 is slid and mounted. Moreover, further integration of the hammer drill 1 with the dust collecting device 40 can also be realized by the fitting of the press rail 62 in the guide groove 26.

Furthermore, the rubber piece 60 and the press plate 66, which press the mating side when the hammer drill 1 and the dust collecting device 40 are mounted to each other, are provided on the outer face of the dust collecting device 40 in the mounting direction of the dust collecting device 40 (a longitudinal direction) and in a direction intersecting therewith, respectively. Therefore, the rubber piece 60 can suppress the longitudinal jouncing between the hammer drill 1 and the dust collecting device 40, and the press plate 66 can suppress the vertical jouncing between the hammer drill 1 and the dust collecting device 40. Accordingly, unification can be enhanced when the dust collecting device 40 is mounted.

In addition, the hammer drill 1 is provided with the female terminals 29 and the plug-in port 34, and the dust collecting device 40 is provided with the male terminals 57. Therefore, the hammer drill 1 has no protruding region resulting from the terminals. As a result, there is no obstacle when the hammer drill 1 is used alone.

Besides, the protection ribs 59 are provided along the male terminals 57 respectively. Thus, an effect of preventing the male terminals 57 from being damaged is achieved.

It should be noted that the shutter portion is provided on the upper side of the connector to allow the connector to rotate upward to the connection position and downward to the non-connection position in the foregoing first embodiment of the present invention. However, the shutter portion may be provided on the lower side of the connector to allow the connector to rotate upward to the non-connection position and downward to the connection position. Further, the connector is not absolutely required to rotate vertically. It is also possible to set a rotational shaft of the connector vertically and allow the connector to laterally rotate to the connection position and the non-connection position. The position and shape of the press strip can also be appropriately changed in accordance with the mode of rotation of the connector.

Furthermore, it is not indispensable that the connector be structured to rotate. It is also acceptable that the connector be vertically or laterally provided slidably between the connection position and the non-connection position and be urged toward the non-connection position by an urging unit such as a coil spring, a leaf spring, or the like.

The elastic members should not be limited to the rubber piece and the press plate as in the foregoing first embodiment of the present invention. Both the elastic members may be rubber pieces, or on the contrary, press plates. The elastic members may be provided on the hammer drill side instead of being provided on the dust collecting device. Further, instead of the rubber piece and the press plate, elastic members such as leaf springs or the like can also be adopted. Furthermore, although the elastic members are provided in both the mounting direction of the dust collecting device and the direction intersecting therewith in the foregoing first embodiment of the present invention, it is also acceptable that an elastic member be provided only in one of the directions.

[Second Embodiment]

Next, another embodiment of the present invention will be described. It should be noted, however, that component parts identical to those of the first embodiment of the present invention are denoted by the same reference symbols respectively, and that the same description will be omitted.

Figure 6:
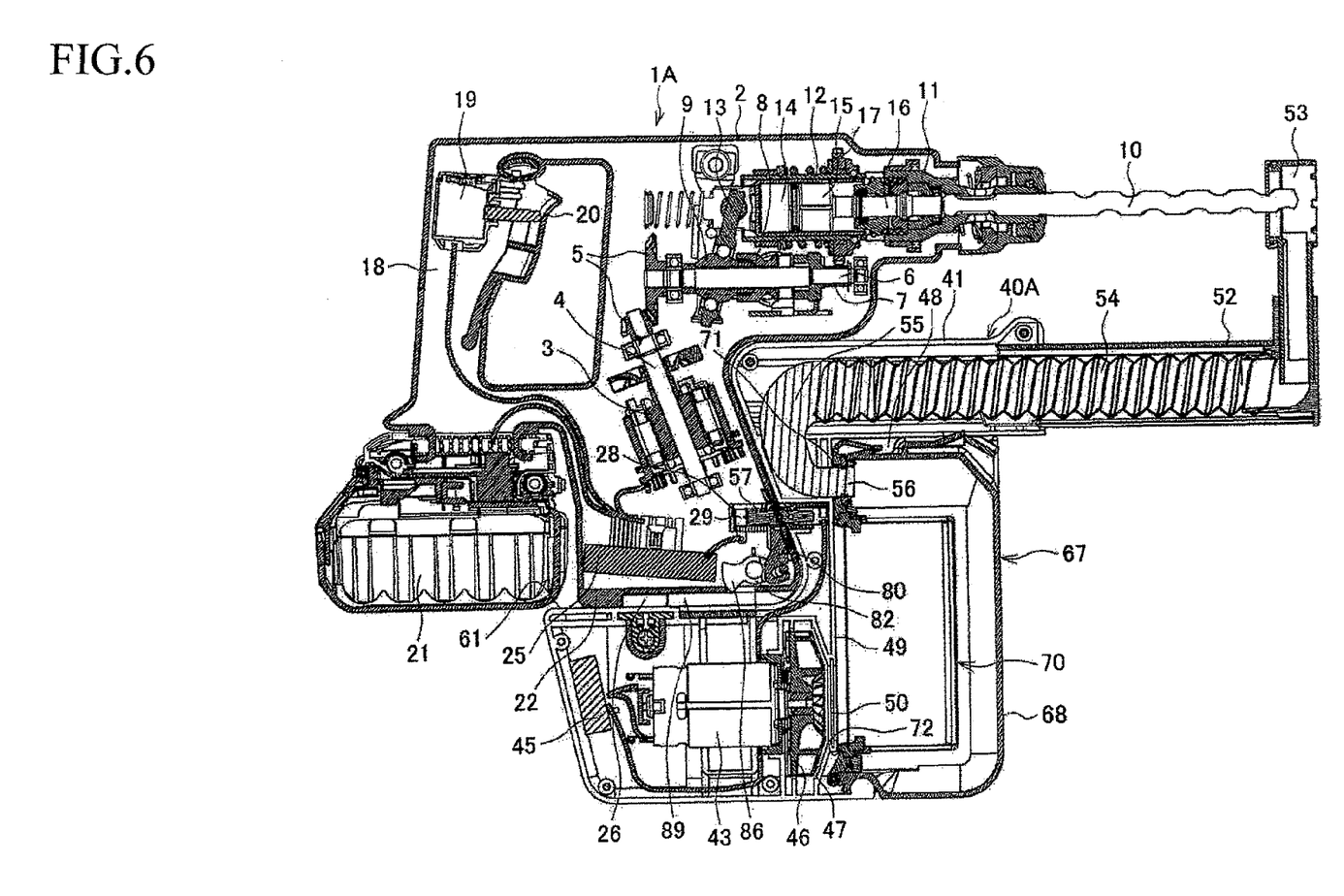
FIG. 6 is a longitudinal sectional view of a hammer drill mounted with a dust collecting device according to a second embodiment of the present invention.
Figure 7:
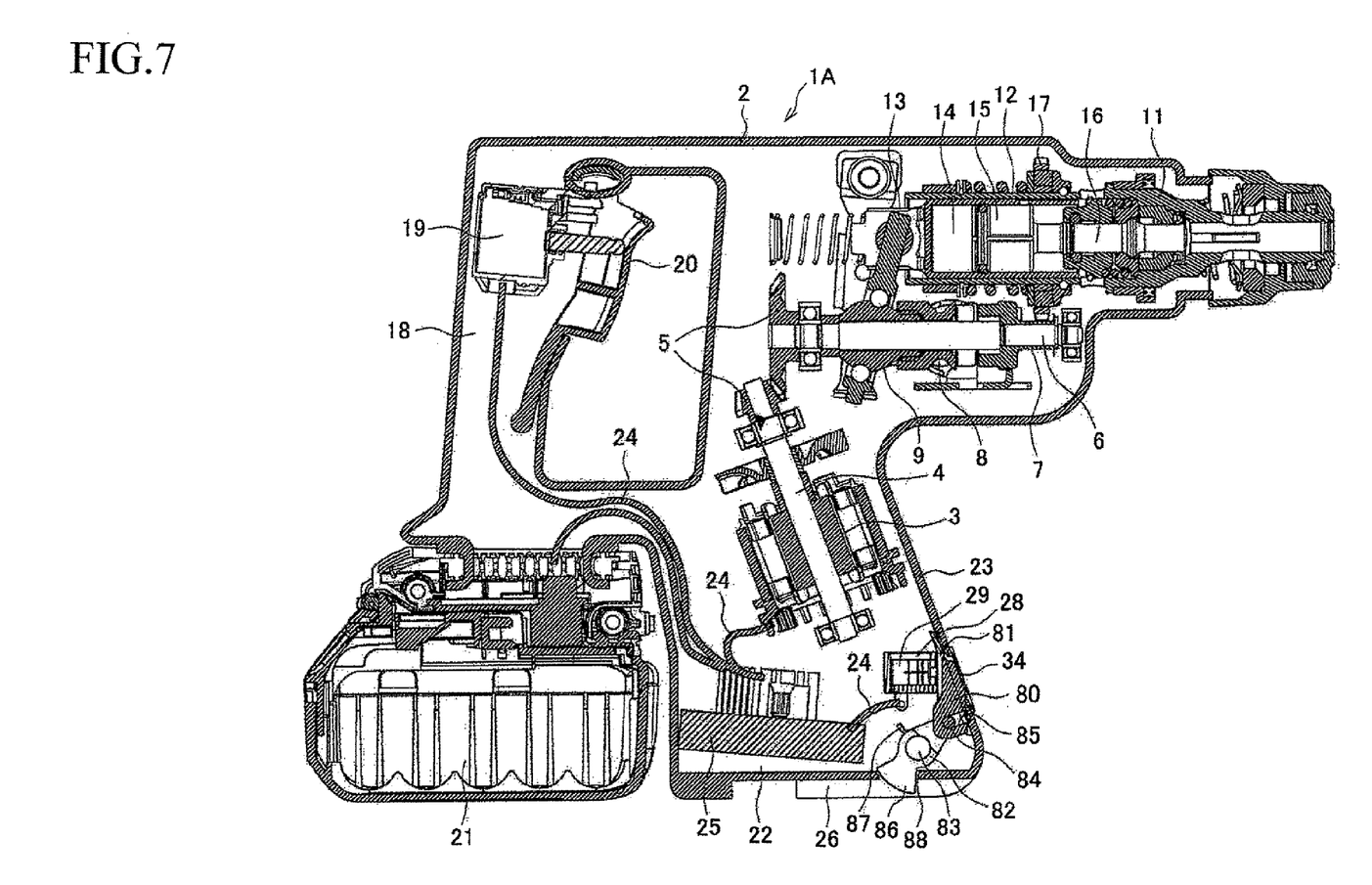
FIG. 7 is a longitudinal sectional view of the hammer drill according to the second embodiment of the present invention.

In a hammer drill 1A shown in FIGS. 6 and 7, the connector 28 equipped with the female terminals 29 is fixed in the housing 2 in a forward-directed posture in which the opening is located directly behind the plug-in port 34. A shutter 80 that opens/closes the plug-in port 34 is provided separately.

The shutter 80 is a plate body having a front face designed as an inclined face that matches the inclined face portion 23 and decreases in thickness upward. The shutter 80 is vertically movably supported between the closed position of the plug-in port 34 and the open position of the plug-in port 34 by seats 81 protrusively provided vertically on inner faces of right and left half housings respectively.

Further, a rotary link 82 as a rotary member is provided on the lower portion of the mounting portion 22 behind the shutter 80. The rotary link 82 is supported at a center thereof rotatably in the mounting portion 22 by a lateral shaft 83. A pin 84 laterally provided at a front end of the rotary link 82 is loosely inserted in an inclined groove 85 provided in a lower portion of the shutter 80 and inclined downward and backward. On the other hand, a fan-like cam portion 86 is formed at the other end of the rotary link 82. Further, the rotary link 82 is rotationally urged in a leftward rotational direction in FIGS. 6 and 7 by a torsion spring 87. Accordingly, in a normal state, the rotary link 82 protrudes the cam portion 86 into the guide groove 26 via a permeable hole 88 provided through a bottom portion of the mounting portion 22, and presses the shutter 80 upward by the pin 84 to hold the shutter 80 at the closed position of the plug-in port 34.

Figure 8:
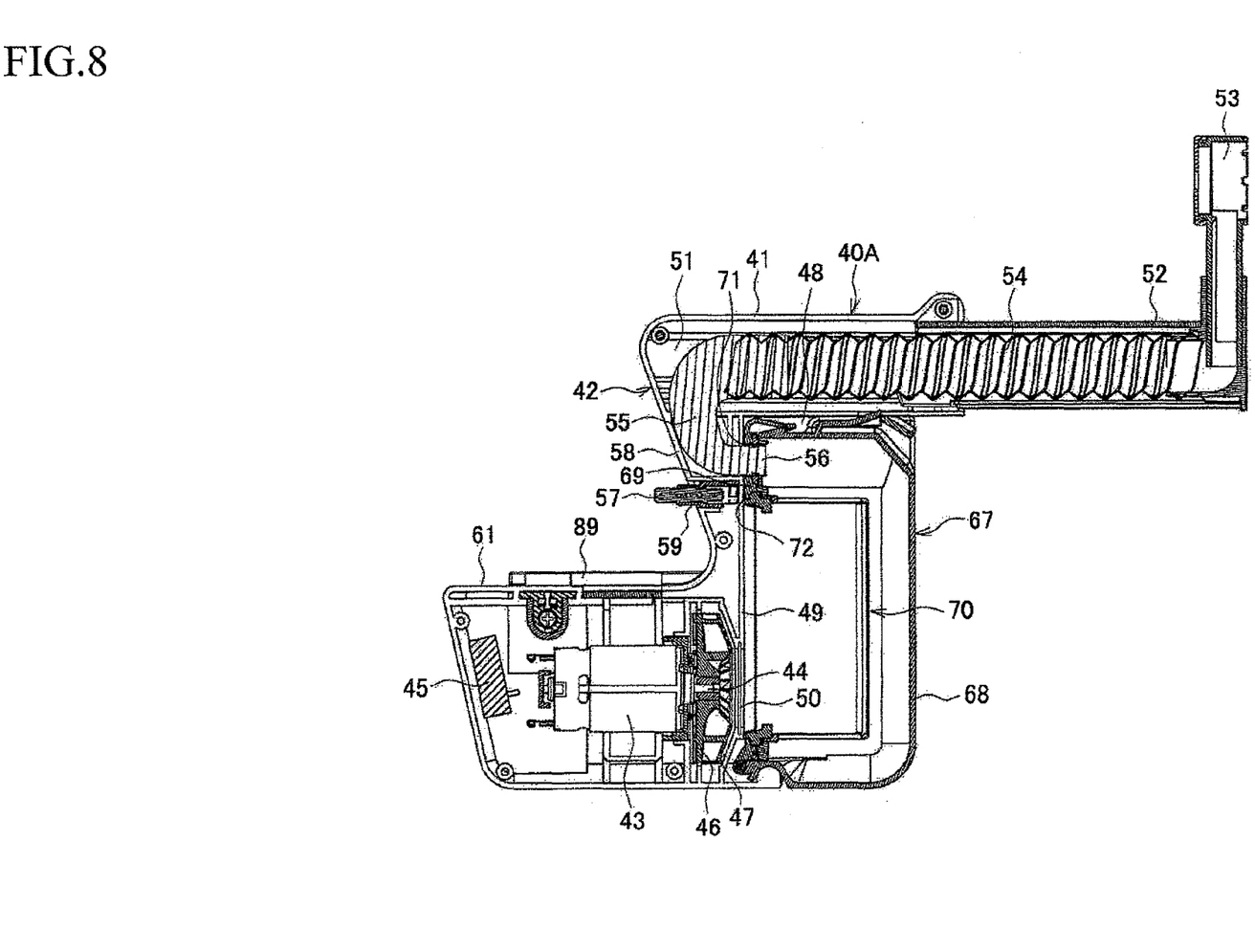
FIG. 8 is a longitudinal sectional view of the dust collecting device according to the second embodiment of the present invention.

On the other hand, in a dust collecting device 40A shown in FIG. 8, a press rail 89 fitted in the guide groove 26 of the mounting portion 22 of the hammer drill 1A is longitudinally provided protrusively on the placement face 61.

In the hammer drill 1A constructed as described above, in mounting the dust collecting device 40A thereto, the dust collecting device 40A is so slid backward as to fit the fitting recess portion 42 from before to the mounting portion 22, with the press rail 89 of the dust collecting device 40A adjusted in position to the guide groove 26 in the lower face of the mounting portion 22 of the hammer drill 1. Then, the press rail 89 slides backward in the guide groove 26, comes into abutment on the cam portion 86 of the rotary link 82 in the meantime, and presses the cam portion 86 upward to rotate the rotary link 82 rightward in FIG. 7. Accordingly, the pin 84 pulls in the shutter 80 to the open position located below, thus opening the plug-in port 34. At this moment, the pin 84 pulls in the shutter 80 while sliding relatively forward in the inclined groove 85 of the shutter 80. Therefore, for the same amount of rotation, the shutter 80 can be slid downward with a larger stroke owing to the inclination of the inclined groove 85.

After that, the male terminals 57 of the dust collecting device 40A enter the housing 2 from the open plug-in port 34, and are inserted through and electrically connected to the female terminals 29 as soon as the mounting portion 22 is fitted into the fitting recess portion 42 (FIG. 6).

On the other hand, as for the removal of the dust collecting device 40A, the dust collecting device 40A is slid forward from the hammer drill 1A as opposed to the case of mounting. Then, the guidance of the press rail 89 by the guide groove 26 causes the dust collecting device 40A to slide forward, and the male terminals 57 separate from the female terminals 29 and are drawn out from the plug-in port 34 as the dust collecting device 40A slides forward. After that, the rotary link 82 whose cam portion 86 has been stopped from being pressed upward by the advanced press rail 89 rotates leftward through the urging of the torsion spring 87, and hence presses the shutter 80 upward via the pin 84. Accordingly, the shutter 80 returns to the closed position to close the plug-in port 34.

As described above, according to the hammer drill 1A of the foregoing second embodiment of the present invention, the hammer drill 1A on which the female terminals 29 are provided are provided with the shutter 80 slidable between the open position of the plug-in port 34 and the closed position of the plug-in port 34, the rotary link 82 rotatable through engagement of one end thereof with the shutter 80, and the torsion spring 87 that urges the rotary link 82 in a rotational direction in which the shutter 80 slides to the closed position. The dust collecting device 40A on which the male terminals 57 are provided is provided with the press rail 89 that comes into abutment on the cam portion 86 of the rotary link 82 to rotate the rotary link 82, against the urging of the torsion spring 87, in a rotational direction in which the shutter 80 slides to the open position as the dust collecting device 40A is mounted. Thus, the plug-in port 34 on the female terminals 29 side can be reliably opened when the male terminals 57 are plugged thereinto. As a result, reliability can be ensured in plug-in connection. Further, since the shutter 80 is slid by the rotary link 82, a mechanism for opening/closing the plug-in port 34 can be formed in a space-saving manner. Thus, there is no obstacle to making the hammer drill 1A and the dust collecting device 40A compact.

Especially in this case, the guide groove 26 parallel to the sliding direction of the dust collecting device 40A is provided in the outer face of the hammer drill 1A, the cam portion 86 of the rotary link 82 is protruded into the guide groove 26, and the press portion is designed as the press rail 89 that is provided on the outer face of the dust collecting device 40A and slides in the guide groove 26 to come into abutment on the cam portion 86 of the rotary link 82 as the dust collecting device 40A is mounted. Thus, the rotary link 82 can be smoothly rotated in accordance with the mounting of the dust collecting device 40A through sliding. Besides, further integration of the dust collecting device 40A with the hammer drill 1A can also be realized through the fitting of the press rail 89 in the guide groove 26.

It should be noted that the rotary link is rotatable around the lateral shaft in the foregoing second embodiment of the present invention. However, the rotary link may also be provided rotatably around a longitudinal shaft and coupled at one end thereof to the shutter, and the shutter may be pulled in downward through the rotation of the rotary link resulting from the entrance of the rail, due to a tapered face or tapered faces provided on the rear face of the rail and/or the front face of the cam portion at the other end of the rotary link. That is, the rotational direction of the rotary member and the mode of abutment on the press portion can be appropriately changed.

Further, it is also possible to provide the shutter and the rotary member above or beside the female terminals and slide the shutter upward or sideward to open the plug-in port.

Furthermore, in the foregoing second embodiment of the present invention as well as the foregoing first embodiment of the present invention, it is acceptable to adopt the joint grooves 27 and the guide rails 64 for the purpose of joining the hammer drill 1A and the dust collecting device 40A to each other, or interpose elastic members such as the rubber piece 60, the press plate 66, and the like between the hammer drill 1A and the dust collecting device 40A.

In both the foregoing first embodiment of the present invention and the foregoing second embodiment of the present invention, only a pair of positive and negative male terminals and only a pair of positive and negative female terminals may be provided. Especially in the male terminals, the shape of the protection ribs can obviously be changed. Besides, it is also conceivable to make, for example, such a design change that the protection ribs are retractably provided on the casing of the dust collecting device, that an urging unit such as a coil spring or the like urges, in a normal state, the protection ribs toward a protrusion position where the protection ribs protrude from the casing to protect the male terminals, and that the protection ribs come into abutment on the housing side of the electric tool and retreat when mounting the dust collecting device to the electric tool.

Further, the arrangement of the male terminals and the female terminals can be made reverse to the aforementioned arrangement. That is, it is also possible to provide the electric tool and the attachment device with the male terminals and the female terminals respectively.

Furthermore, the attachment device is not limited to the dust collecting device, but may be, for example, a lighting unit or the like equipped with an LED or the like. As a matter of course, the electric tool is not limited to the hammer drill either. The present invention is also applicable to a case where the electric tool is another kind of electric tool such as an electric drill or an electric hammer.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An attachment device-equipped electric tool to which an attachment device is joined, comprising:
    a male terminal protrusively provided on one of the electric tool and the attachment device;
    a female terminal that is provided on the other of the electric tool and the attachment device, is located inside a plug-in port into which the male terminal can be inserted, and is electrically connected to the male terminal to allow power to be supplied from the electric tool to the attachment device as the attachment device is joined to the electric tool;
    a connector that is provided on the other of the electric tool and the attachment device to support the female terminal, and is movable between a connection position where the female terminal is located inside the plug-in port and a non-connection position where the female terminal is in retreat from inside the plug-in port;

an urging unit provided on the other of the electric tool and the attachment device to urge the connector toward the non-connection position;

a shutter portion that is provided on the connector, is located inside the plug-in port at the non-connection position to close the plug-in port, and is in retreat from inside the plug-in port at the connection position; and a press portion that is provided on the one of the electric tool and the attachment device and comes into abutment on the connector to move the connector to the connection position against urging of the urging unit as the attachment device is mounted.

2. The attachment device-equipped electric tool according to claim 1, wherein the connector is provided rotatably between the connection position and the non-connection position.

3. The attachment device-equipped electric tool according to claim 2, wherein the attachment device is slid and mounted to the electric tool, the other of the electric tool and the attachment device on which the female terminal is provided has an outer face provided with a guide groove parallel to a direction of the sliding so that part of the connector protrudes into the guide groove, and the press portion is a press rail that is provided on an outer face of the one of the electric tool and the attachment device on which the male terminal is provided and slides in the guide groove to come into abutment on the part of the connector as the attachment device is mounted.

4. The attachment device-equipped electric tool according to claim 2, wherein the connector is vertically rotatably supported.

5. The attachment device-equipped electric tool according to claim 4, wherein the connector is rotatably supported by fitting bosses protrusively provided on an inner face of a housing of the electric tool into circular recess portions formed in right and left outer faces of the connector respectively.

6. The attachment device-equipped electric tool according to claim 2, wherein the shutter portion is an arc-like plate body whose center is a rotational center of the connector.

7. The attachment device-equipped electric tool according to claim 1, wherein the attachment device is slid and mounted to the electric tool, the other of the electric tool and the attachment device on which the female terminal is provided has an outer face provided with a guide groove parallel to a direction of the sliding so that part of the connector protrudes into the guide groove, and the press portion is a press rail that is provided on an outer face of the one of the electric tool and the attachment device on which the male terminal is provided and slides in the guide groove to come into abutment on the part of the connector as the attachment device is mounted.

8. The attachment device-equipped electric tool according to claim 1, wherein the electric tool is provided with the plug-in port and the female terminal, and the attachment device is provided with the male terminal.

9. The attachment device-equipped electric tool according to claim 1, wherein the male terminal has a protection rib provided therealong.

10. The attachment device-equipped electric tool according to claim 9, wherein the protection rib is provided parallel to the male terminal at an outer position thereof.

11. The attachment device-equipped electric tool according to claim 1, wherein at least one of the electric tool and the attachment device has an outer face provided with an elastic member that presses the other of the electric tool and the attachment device when the electric tool and the attachment device are mounted to each other, in at least one of a mounting direction of the attachment device and a direction intersecting therewith.

12. The attachment device-equipped electric tool according to claim 11, wherein the elastic member is a rubber piece.

13. The attachment device-equipped electric tool according to claim 11, wherein the elastic member is a metallic press plate formed by bending such that a central portion thereof protrudes.

14. The attachment device-equipped electric tool according to claim 1, wherein the attachment device is formed with a placement face on which a mounting portion formed on a housing of the electric tool is placed, a pair of right and left guide rails are formed in a standing manner on the placement face and are arranged at such an interval that a lower portion of the mounting portion can be fitted therebetween, streak-like protrusions are formed at upper ends of the guide rails, and can be fitted into a pair of right and left joint grooves formed in both lateral faces of the lower portion of the mounting portion, and the attachment device is joined to the electric tool by sliding the mounting portion between the guide rails to fit the streak-like protrusions into the joint grooves respectively.

15. The attachment device-equipped electric tool according to claim 1, wherein the attachment device is a dust collecting device that gathers powder dust produced from a worked material through use of the electric tool.

16. The attachment device-equipped electric tool according to claim 15, wherein the dust collecting device is removably equipped with a dust box for gathering the powder dust.

17. An attachment device-equipped electric tool to which an attachment device is joined, comprising:

a male terminal protrusively provided on one of the electric tool and the attachment device;

a female terminal that is provided on the other of the electric tool and the attachment device, is located inside a plug-in port into which the male terminal can be inserted, and is electrically connected to the male terminal to allow power to be supplied from the electric tool to the attachment device as the attachment device is joined to the electric tool;

a shutter that is provided on the other of the electric tool and the attachment device and can slide between an open position and a closed position of the plug-in port;

a rotary member that is provided on the other of the electric tool and the attachment device and can rotate through engagement of one end thereof with the shutter;

an urging unit provided on the other of the electric tool and the attachment device to urge the rotary member in a rotational direction in which the shutter slides to the closed position; and a press portion that is provided on the one of the electric tool and the attachment device and comes into abutment on the other end of the rotary member to rotate the rotary member, against urging of the urging unit, in a rotational direction in which the shutter slides to the open position as the attachment device is mounted.

18. The attachment device-equipped electric tool according to claim 17, wherein the attachment device is slid and mounted to the electric tool, the other of the electric tool and the attachment device on which the female terminal is provided has an outer face provided with a guide groove parallel to a direction of the sliding so that the other end of the rotary member protrudes into the guide groove, and the press portion is a press rail that is provided on an outer face of the one of the electric tool and the attachment device on which the male terminal is provided and slides in the guide groove to come into abutment on the other end of the rotary member as the attachment device is mounted.

19. The attachment device-equipped electric tool according to claim 17, wherein the electric tool is provided with the plug-in port and the female terminal, and the attachment device is provided with the male terminal.

20. The attachment device-equipped electric tool according to claim 17, wherein the male terminal has a protection rib provided therealong.

21. The attachment device-equipped electric tool according to claim 20, wherein the protection rib is provided parallel to the male terminal at an outer position thereof.

22. The attachment device-equipped electric tool according to claim 17, wherein at least one of the electric tool and the attachment device has an outer face provided with an elastic member that presses the other of the electric tool and the attachment device when the electric tool and the attachment device are mounted to each other, in at least one of a mounting direction of the attachment device and a direction intersecting therewith.

23. The attachment device-equipped electric tool according to claim 22, wherein the elastic member is a rubber piece.

24. The attachment device-equipped electric tool according to claim 22, wherein the elastic member is a metallic press plate formed by bending such that a central portion thereof protrudes.

25. The attachment device-equipped electric tool according to claim 17, wherein the attachment device is formed with a placement face on which a mounting portion formed on a housing of the electric tool is placed, a pair of right and left guide rails are formed in a standing manner on the placement face and are arranged at such an interval that a lower portion of the mounting portion can be fitted therebetween, streak-like protrusions are formed at upper ends of the guide rails, and can be fitted into a pair of right and left joint grooves formed in both lateral faces of the lower portion of the mounting portion, and the attachment device is joined to the electric tool by sliding the mounting portion between the guide rails to fit the streak-like protrusions into the joint grooves respectively.

26. The attachment device-equipped electric tool according to claim 17, wherein the attachment device is a dust collecting device that gathers powder dust produced from a worked material through use of the electric tool.

27. The attachment device-equipped electric tool according to claim 26, wherein the dust collecting device is removably equipped with a dust box for gathering the powder dust.

* * * * *